United States Patent [19]

Szlakman

[11] 4,038,845
[45] Aug. 2, 1977

[54] AUTOMOBILE SECURITY APPARATUS

[76] Inventor: Nathan Szlakman, 3627 W. 104th St., Inglewood, Calif. 90303

[21] Appl. No.: 704,313

[22] Filed: July 12, 1976

[51] Int. Cl.$^2$ .................. B60R 25/02; B62H 5/04; E05B 67/22
[52] U.S. Cl. .................................... 70/211; 70/38 A
[58] Field of Search ............ 70/26, 38 A, 39, 210, 70/211, 212, 226, 227, 233, 234, 235, 236, 237

[56] References Cited

U.S. PATENT DOCUMENTS

| | | | |
|---|---|---|---|
| 877,747 | 1/1908 | Snook | 70/39 X |
| 1,359,729 | 11/1920 | Nichols | 70/211 X |
| 1,461,725 | 7/1923 | Cooper | 70/39 X |
| 1,594,683 | 8/1926 | Nelson | 70/211 |
| 1,709,839 | 4/1929 | Chittenden et al. | 70/211 |

FOREIGN PATENT DOCUMENTS 751,018  6/1933  France .................. 70/211

Primary Examiner—Roy D. Frazier
Assistant Examiner—Thomas J. Holko

[57] ABSTRACT

The invention is an automobile security apparatus for securing the steering wheel of an automobile to its steering housing thereby inhibiting theft of the automobile. The automobile security apparatus includes a locking assembly, a steering wheel lock for securing the steering wheel, and a steering housing connector for securing the locking assembly by two bolts to the steering housing of the automobile. When the steering wheel lock has been inserted into the locking assembly, its ends block access to the bolts connecting the locking assembly to the steering housing connector.

8 Claims, 9 Drawing Figures

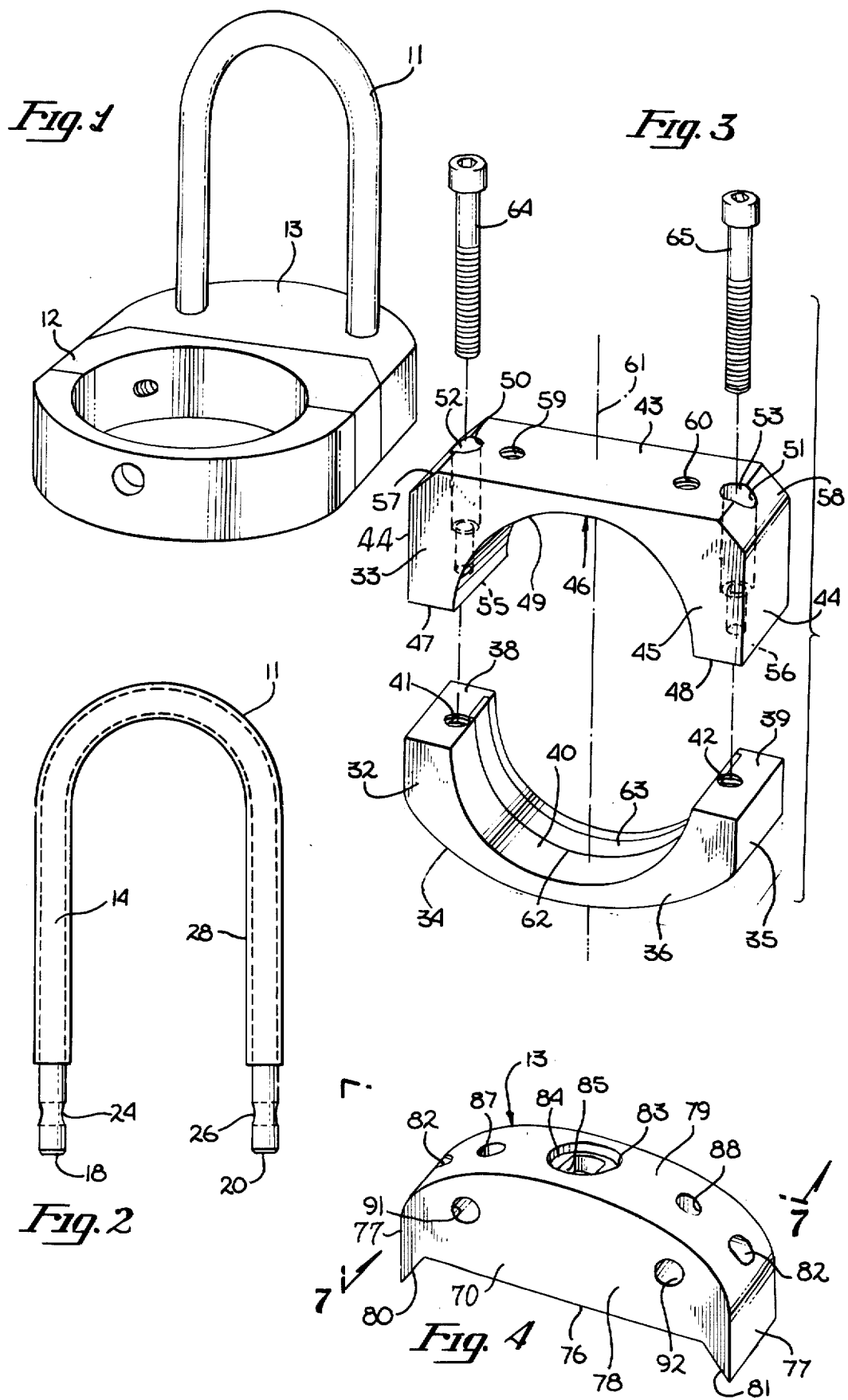

AUTOMOBILE SECURITY APPARATUS

BACKGROUND OF THE INVENTION

1. Field of the Invention

The present invention relates generally to an automobile security apparatus and more particularly to an automobile security apparatus which fixedly secures the steering wheel of an automobile to the steering housing thereof.

2. Prior Art

The use of automobile security apparatus for locking the steering wheel of an automobile in a fixed position is well known in the prior art as exemplified by numerous patents disclosing automobile security apparatus. U.S. Pat. No. 1,359,729, entitled, *Locking Mechanism for Motor Vehicles*, issued to J. R. Nichols on Nov. 23, 1920, teaches a locking mechanism comprising a sectional collar, formed in two sections that are adapted to be disposed around and to be fixedly secured to the steering housing of an automobile. The sections are secured together by rivets, which are countersunk into each section thereby impeding their removal. A disadvantage of using rivets to secure the locking mechanism to the steering housing is that these rivets must be cut through in order to remove the locking mechanism from the steering housing.

U.S. Pat. No. 1,709,839, entitled, *Means for Securing the Steering Wheels of Motor Vehicles*, issued to C. E. Chittenden on Apr. 23, 1923, teaches a locking mechanism wherein the collar attached by mounting bolts to the steering housing of an automobile cannot be removed therefrom when the steering wheel has been locked in place by the locking mechanism. The advantage of Chittenden's automobile security apparatus over the apparatus taught by U.S. Pat. No. 1,359,729, supra, is that the locking mechanism is bolted on the steering housing by mounting bolts and that it cannot be removed once it has locked the steering wheel in a fixed position because the locking mechanism includes a hinged lever which covers the mounting bolts. But this prior art apparatus also has several disadvantages. First, the apparatus is costly to manufacture because its steel components must be formed and machined. Second, when installed in an automobile the apparatus is located in an awkward place for a driver of the automobile because the hinged lever, when the apparatus is unlocked, is too close to the driver's knees.

SUMMARY OF THE INVENTION

The present invention is an automobile security apparatus which locked the steering wheel of an automobile to the steering housing thereof in a fixed position. The automobile security apparatus is comprised of a steering wheel lock, a locking assembly, having locking bores for securing the steering wheel locked and connector bores, and a steering housing connector for connecting the locking assembly to the steering housing of the automobile. A bolt in each connector bore assures the locking assembly cannot be disconnected from the steering housing connector once the steering wheel lock has been inserted into the locking assembly because the bolt in each connector bore of the locking assembly is made inaccessible by the insertion of the steering wheel lock. The present invention may be easily installed into or removed from the steering housing of an automobile, once the steering wheel lock has been removed from the locking assembly, by the insertion, or removal, respectively, of four bolts.

It is, therefore, an object of the present invention to provide an inexpensive automobile apparatus for preventing automobile thefts.

It is still another object to provide an automobile security apparatus that is more secure that the prior art automobile security apparatus.

It is yet another object to provide an automobile security apparatus which is simple to install in or remove from an automobile.

The novel features which are believed to be characteristic of the invention both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawing is for the purpose of illustration and description only and is not intended as a definition of limits of the invention.

BRIEF DESCRIPTION OF THE DRAWINGS

FIG. 1 is a perspective view of an automobile security apparatus in accordance with the present invention.

FIG. 2 is a perspective view of the steering wheel lock of the automobile security apparatus shown in FIG. 1.

FIG. 3 is an exploded assembly view of the steering housing connector of the automobile security apparatus shown in FIG. 1.

FIG. 4 is a perspective view of the locking assembly of the automobile security apparatus shown in FIG. 1.

DESCRIPTION OF THE PRESENTLY PREFERRED EMBODIMENT

Figure 5:
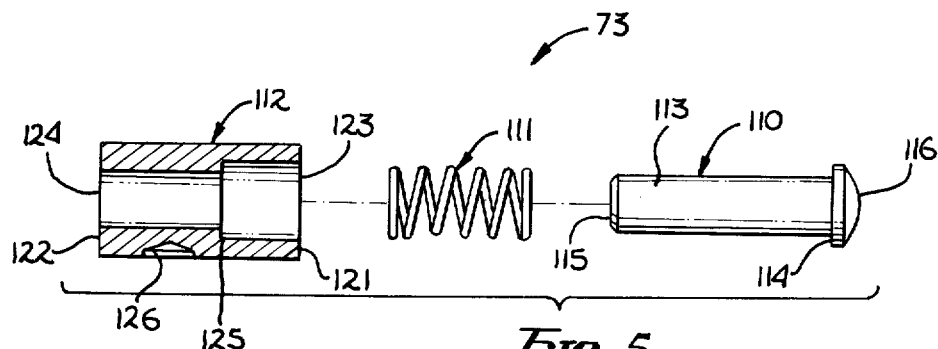
FIG. 5 is an exploded assembly view of the pin assembly of the locking assembly shown in FIG. 4.

An understanding of the present invention can best be gained by reference to FIG. 1 wherein a perspective view of a form of the present invention is shown. The present invention generally comprises steering wheel lock 11, steering housing connector 12, and locking assembly 13. Referring to FIG. 2, steering wheel lock 11 comprises a U-shaped member 14 having ends 18 and 20. Steering wheel lock 11 has axially aligned locking bores 24 and 26 disposed at ends 18 and 20 respectively thereof. The steering wheel lock 11 is covered by rubber coating 28 as illustrated in the preferred embodiment of the present invention. However, it is within the scope of the present invention to utilize coating material such as vinyl or plastic thereby providing different embodiments of the present invention.

Steering housing connector 12 shown in FIG. 3 is comprised of two connector elements 32 and 33. First connector element 32 has base surface 34, parallel side surfaces 35, and parallel face surfaces 36. The top surface of first block 32 has two coplanar portions 38 and 39 joined by an intermediate curved third portion 40. First and second threaded sockets 41 and 42 are disposed perpendicular to portions 38 and 39, respectively. An alternative embodiment of the present invention incorporates a base surface 34 of first block 32 convex to top surface 37, thereby eliminating side surfaces 35.

Second connecting element 33 has top surface 43, parallel side surfaces 44, and parallel face surfaces 45. Base surface 46 of second connector element 33 has two portions 47 and 48 parallel to top surface 43 and curved third portion 49. First and second connecting apertures 50 and 51 disposed perpendicular through top surface 43 are comprised of first and second bores 52 and 53, respectively, of uniform diameter which are in communication with third and fourth bores 55 and 56, respectively, of smaller uniform diameters smaller than those of first and second bores 52 and 53 and are aligned with first and second threaded sockets 41 and 42, respectively, of first connecting element 32. First and second flat surface 57 and 58 disposed at an angle of approximately 45° to planar base surface 43 and at an angle of approximately 45° to side surface 44 are integrally joined to base surface 43 and side surfaces 44. Third and fourth threaded sockets 59 and 60 which are perpendicular to base surface 43 are disposed between first and second bores 52 and 53 and are spaced equal distances apart from centerline 61 of first connecting element 32 and second connecting element 33.

First connecting element 32 has groove 62 disposed within curved portion 40 of top surface 37 thereof into which hardened steel insert 63 is loosely inserted therein. Steel insert 63 provides additional security to the automobile security apparatus because it is very difficult to cut through a hardened steel insert unless the insert is firmly held.

Hardened steel bolts 64 and 65 are inserted into first and second connecting apertures 50 and 51 of second connecting element 33 and are threaded into first and second threaded sockets 41 and 42 of first connecting element 32 thereby securing steering housing connector 12 intimately around the steering housing of the automobile. There are on required changes to the steering housing in order to connect steering housing connector 12.

Figure 7:
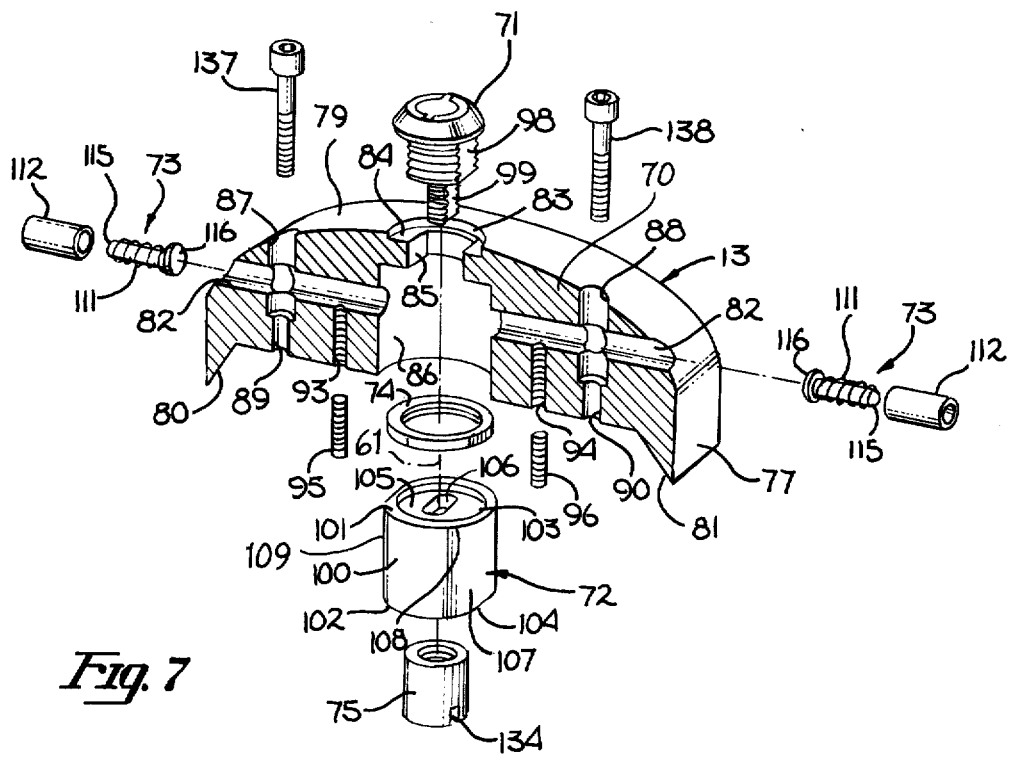
FIG. 7 is a side elevation, partial cross-sectional, exploded, assembly view of the locking assembly of the automobile security apparatus of FIG. 1 taken through line 7—7 of FIG. 4.
Figure 8:
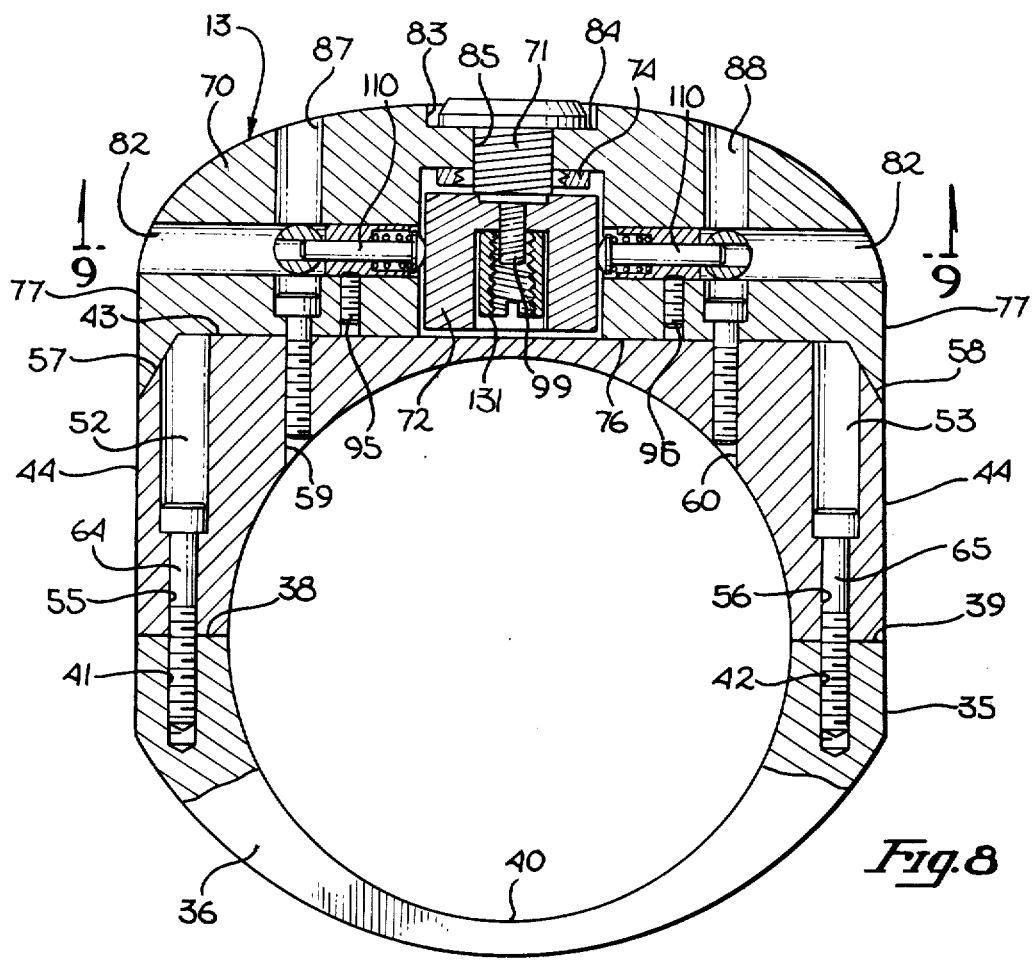
FIG. 8 is a partial cross section of the invention illustrating the assembly of the parts of FIG. 7.

Locking assembly 13 shown in FIGS. 4, 7 and 8 includes locking block 70, lock member 71, cam 72, pin assembly 73, and lock member mounting elements 74 and 75. Locking block 70 has base surface 76, first and second parallel side surfaces 77, parallel face surfaces 78 and top surfaces 79. In the preferred embodiment of the present invention base surface 76 has third and fourth flat surfaces 80 and 81 disposed at approximately 45° to both base surface 76 and each of first and second side surfaces 77, respectively. First and second flat surfaces 57 and 58 cooperatively engage third and fourth surface 80 and 81, respectively. First aperture 82 is disposed parallel through first side surface to second side surface 77 and parallel to base surface 76. Centerline cavity 83 of uniform diameter is disposed about centerline 61 perpendicular to base surface 76 extending to a point intermediate between base surface 76 and top surface 79 and is joined integrally with first internal surface 84 disposed along centerline 61 parallel to base surface 76 and having parallel slotted opening 85. First internal bore 86 having a uniform diameter and being disposed about centerline 61 perpendicular to base surface 76 communicates with base surface 76 and first internal surface 84. Connecting apertures 87 and 88 of uniform diameters are disposed through top surface 79 and are spaced equal distances from internal bore 86 and bores 89 and 90 of smaller uniform diameters than those of apertures 87 and 88 are disposed perpendicular to base surface 76 and communicate with apertures 87 and 88, respectively, substantially near the base surface 76. Locking sockets 91 and 92 of uniform diameters disposed through face surfaces 78 and perpendicular thereto intersect connecting apertures 87 and 88, respectively. Threaded sockets 93 and 94 disposed through base surface 76 perpendicular thereto intermediate to bores 89 and 90 and spaced equal distances from centerline 61 of base surface 76 extend to first aperture 82. Anchor screws 95 and 96 which are standard headless screws are inserted into threaded socket 93 and 94.

Figure 6:
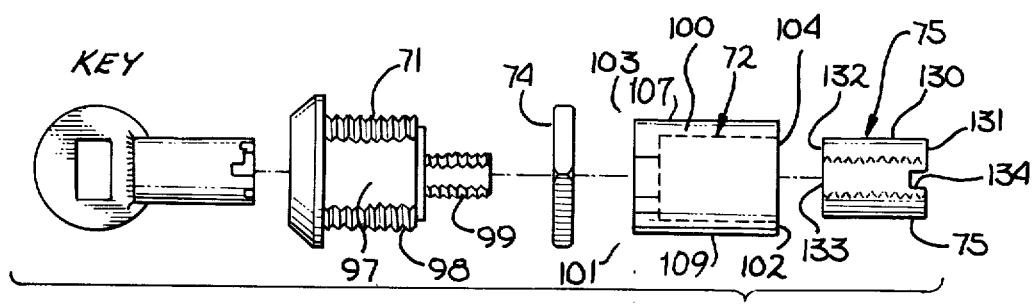
FIG. 6 is an exploded assembly view of the lock mechanism of the locking assembly shown in FIG. 4.

Standard lock member 71 shown in FIGS. 6, 7 and 8 is comprised of locking device 97, threaded cylindrical rod 98 of uniform diameter, and threaded cylindrical rod 99 of a smaller uniform diameter.

Figure 9:
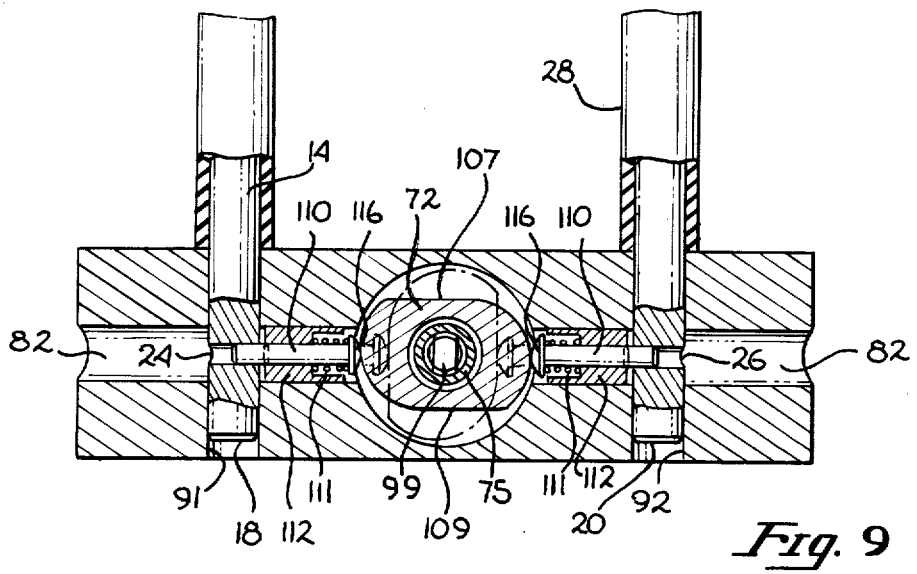
FIG. 9 is a partial cross section taken along line 9—9 of FIG. 8.

Referring now to FIGS. 6 and 7, cam 72 is comprised of generally cylindrical rod 100 having the cross section shown in FIG. 9 and having ends 101 and 102. Cam 72 has axially disposed first bore 103 of uniform diameter at end 101 thereof and axially disposed second bore 104 at end 102 of a larger uniform diameter than that of first bore 103. Second internal surface 105 is internally disposed intermediate to bore 103 and 104. Internal surface 105 has parallel slotted opening 106. Cam 72 has first cam surface 107 disposed perpendicular to the parallel slot opening of slotted opening 106 extending from end 101 to taper 108, which is substantially close to end 102 thereof. Cam 72 has a second cam surface 109 disposed perpendicular to parallel slotted opening 106 extending from taper 108 to end 102 thereof.

Pin assembly 73 shown in FIGS. 5 and 7 comprises plunger 110, helical coil spring 111 and collar 112. Plunger 110 is cylindrical rod 113 of uniform diameter having ends 114 and 115 and having head 116 disposed at end 114 thereof. Collar 112 is shown having ends 121 and 122 and having axially disposed bore 123 of uniform diameter at end 121 and axially disposed bore 124 of a smaller uniform diameter at end 122. Bores 123 and 124 are integrally joined at point 125 intermediate to ends 121 and 122. Collar 112 has notch 126 disposed intermediate to end 122 and point 125 thereof. Helical coil spring 111 is of a uniform diameter smaller than that of bore 123 and larger than that of bore 124. End 115 of plunger 110 is inserted into helical coil spring 111 and both plunger 110 and helical coil spring 111 are inserted into collar 112 to form pin assembly 73.

Lock member mounting element 74 is a hexagonal nut. Lock member mounting element 75 is comprised of rod 130 having ends 131 and 132 and having axially disposed, threaded bore 133. Rod 130 has slot 134 disposed transverse to its longitudinal axis at end 131 thereof.

Referring to FIGS. 6, 7, 8 and 9 locking assembly 13 has lock member 71 inserted into centerline cavity 83 of locking block 70 and secured by lock member mounting element 74. Locking block 70 locking assembly 13 has slotted opening 85 into which threaded rod 98 of lock member 71 is inserted and secured by lock member mounting element 74.

Cam 72 is inserted into first internal bore 86 of locking block 70 and is secured by lock member mounting element 75 threaded onto threaded rod 99 of lock member 71 which has been inserted through parallel slotted opening 106 of cam 72.

Pin assembly 73 is inserted into each end of first aperture 82 and each pin assembly 73 is secured by anchor screws 95 and 96 respectively in each notch 126 thereof and each head 116 thereof contacts the surface of cam 72. End 121 of collar 112 is flush with the curved surface of centerline cavity 83.

The steering housing connector 12 is mounted on the steering housing of an automobile as described above. Lock member 71 is turned so that surfaces 107 and 109 of cam 72 are parallel to side surfaces 77 of locking block 70 thereby allowing plunger 110 of each locking pin assembly 73 to slide closer to each other, thereby exposing bores 89 and 90. Locking block 70 is joined to steering housing connector 12 by connector bolts 137 and 138 inserted into connecting apertures 87 and 88, respectively, of locking block 70 and threaded bores 59 and 60 of second connector element 33, respectively.

Steering wheel lock 11 is placed on the steering wheel of the automobile and ends 18 and 20 thereof are slideably received into locking bores 91 and 92. Lock member 71 rotates can 72 90° causing the curved surfaces of cam 72 to press head 116 of each plunger 110 into bore 123 of each collar 112 thereby pressing end 115 of each plunger 110 into bores 24 and 26 of steering wheel lock 11 and securing steering wheel lock 11. The automobile security apparatus is secure from tampering and disassembly because ends 18 and 20 of steering wheel lock 11 cover connecting bolts 137 and 138 which have been inserted into connecting bores 87 and 88 thereby making then inaccessible because the head of each connecting bolt is beneath an end of steering wheel lock 11.

When steering wheel lock 11 is removed from locking assembly 13, it may be stored in the glove compartment of the automobile. The locking assembly 13 and steering housing connector 12 rest compactly near the steering housing and are located such that they are not close to the driver's knees.

While the invention has been particularly shown and described with reference to preferred embodiment thereof, it will be understood by those skilled in the art that various changes in form and details may be made therein without departing from the spirit of the invention.

What is claimed is

1. An automobile security apparatus for securing the steering wheel of an automobile to its steering housing, comprising:
   a. a locking block having a base surface, first and second side surfaces, a pair of face surfaces, and a top surface and having a first aperture which is disposed through said locking block from said first side surface to said second side surface being parallel to said base surface, a centerline cavity disposed perpendicular through said base surface and intersecting said first aperture, first and second locking sockets disposed perpendicular through said face surfaces and intersecting said first aperture, and first and second connecting apertures disposed parallel to said face surface through said base surface, each of said connecting apertures intersecting said first aperture and one of said locking sockets respectively;
   b. a U-shaped steering wheel lock having first and second ends, each adapted to be coupled within one said first and second locking sockets of said locking block;
   c. locking means for locking said first and second ends of said steering wheel lock in said first and second locking sockets of said locking block cooperatively disposed within said centerline cavity; and
   d. steering housing connector means for connecting said locking block to the steering housing of the automobile coupled to the connecting apertures of said locking block.

2. An automobile security apparatus as defined in claim 1 wherein said locking means comprises:
   a. a lock member cooperatively received within said centerline cavity and having first and second axially aligned threaded rods;
   b. a cam coupled to said first threaded rod of said lock mechanism and disposed within said centerline cavity;
   c. lock member mounting means for securing said lock member and said cam within centerline cavity coupled to said lock member and said cam; and
   d. first and second pin assembly means for locking each of said ends of said steering wheel lock in each of said locking sockets of said locking block, being disposed in said first aperture of said locking block, and being cooperatively engaged by said cam.

3. An automobile security apparatus as in claim 2 wherein each of said pin assembly means comprises:
   a. a collar having first and second ends and having a first bore of uniform diameter axially disposed through said first end and a second bore of a uniform diameter smaller than that of said first bore axially disposed through said second end, said first and second bores in communication with one another at a point intermediate said first and second ends;
   b. a helical spring cooperatively received with the first bore of said collar; and
   c. a plunger having a head which contacts said cam of said locking member means cooperatively received into both said first bore of said collar and said helical spring.

4. An automobile security apparatus as in claim 3 wherein said steering housing connector means comprises:
   a. a first connector element having a base surface, parallel side surfaces, parallel face surfaces, and a top surface having a curved intermediate portion and two end portions which are in a planar relation with respect to each other and which are perpendicular to said side surfaces; and
   b. a second connector element having a top surface, parallel side surfaces, parallel face surfaces, and a base surface, having a curved intermediate portion and two end portions which are in a planar relation with respect to each other and which are parallel to said top surface, said base surface having a connecting aperture through each of said end portions disposed perpendicular thereto and extending through said top surface, coupled to said first connecting element to form a steering housing connector about the steering housing of the automobile.

5. An automobile security apparatus as in claim 4 wherein said first connector element has a groove disposed within said curved intermediate portion of said surface, and further including a metal insert having the same radius of curvature disposed within said groove.

6. An automobile security apparatus for securing the steering wheel of an automobile comprising:

a. a locking block having a base surface, first and second side surfaces, a pair of face surfaces, and a top surface and having a first aperture which is disposed through said locking block from said first side surface to said second side surface being parallel to said base surface, a centerline cavity disposed perpendicular through said base surface and intersecting said first aperture, first and second locking sockets disposed perpendicular through said face surfaces and intersecting said first aperture, and first and second connecting apertures disposed parallel to said face surface through said base surface, each of said connecting apertures intersecting said first aperture and one of said locking sockets respectively;

b. a U-shaped steering wheel lock having first and second ends adapted to be coupled to said first and second locking sockets of said locking block;

c. steering housing connector means for connecting said locking block to the steering housing of the automobile coupled to the connecting apertures of said locking block;

d. a lock member cooperatively received within said centerline cavity and having a first and second axially aligned threaded rods;

e. a cam coupled to said first threaded rod of said lock mechanism and disposed within said centerline cavity;

f. lock member mounting means for securing said lock member and said cam within centerline cavity coupled to said lock member and said cam; and g. first and second collars, each having first and second ends and having a first bore of uniform diameter axially disposed through said first end and a second bore of a uniform diameter smaller than that of said first bore axially disposed through said second end, said first and second bores in connection with one another at a point intermediate to said first and second ends, each being slideably engaged within said first aperture of said locking block;

h. first and second helical spring cooperatively received with the first bore of each of said collar; and i. first and second plungers, each having a head which contacts said cam of said locking member means cooperatively received into both said first bore of each of said collar and said helical spring.

7. An automobile security apparatus as in claim 6 wherein said steering housing connector means comprises:

a. a first connector element having a base surface, parallel side surfaces, parallel face surfaces, and a top surface having a curved intermediate portion and two end portions which are in a planar relation with respect to each other and which are perpendicular to said side surface; and b. a second connector element having a top surface, parallel side surfaces, parallel face surfaces, and a base surface, having a curved intermediate portion and two end portions which are in a planar relation with respect to each other and which are parallel to said top surface, said base surface having a connecting aperture through each of said end portions disposed perpendicular thereto and extending through said top surface, coupled to said first connecting element to form a steering housing connector about the steering housing of the automobile.

8. An automobile security apparatus as in claim 7 wherein said first connector element has a groove disposed within said curved intermediate portion of said surface, and further including a metal insert having the same radius of curvature disposed within said groove.

* * * * *